United States Patent
Fan et al.

(10) Patent No.: US 6,266,157 B1
(45) Date of Patent: Jul. 24, 2001

(54) METHOD OF ERROR DIFFUSION USING 2×2 COLOR CORRECTION AND INCREMENT MATCHING

(75) Inventors: Zhigang Fan, Webster; Shen-ge Wang, Fairport, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/191,790

(22) Filed: Nov. 13, 1998

(51) Int. Cl.$^7$ .................................................... H04N 1/46
(52) U.S. Cl. ................................ 358/1.9; 382/251
(58) Field of Search ........................... 358/1.9, 504, 406, 358/455–456, 534; 382/251–253

(56) References Cited

U.S. PATENT DOCUMENTS

| | | | |
|---|---|---|---|
| 5,469,267 | 11/1995 | Wang | 358/298 |
| 5,649,073 | 7/1997 | Knox et al. | 395/109 |
| 5,655,061 | 8/1997 | Tse et al. | 395/102 |
| 5,659,634 | 8/1997 | Yeh et al. | 382/232 |
| 5,930,010 | * 7/1999 | Cheung et al. | 358/534 |

FOREIGN PATENT DOCUMENTS

0625847A1  * 11/1994 (EP).

OTHER PUBLICATIONS

"Measurement of Printer Parameters for Model–based Halftoning", Pappas et al., Journal of Electronic Imaging, vol. 2 (3), pp. 193–204, Jul. 1993.

Measurement–based Evaluation of a Printer Dot Model for Halftone Algorithm Tone Correction, by C. J. Rosenberg, Journal of Electronic Imaging, vol. 2 (3), pp. 205–212, Jul. 1993.

* cited by examiner

*Primary Examiner*—Thomas D. Lee
*Assistant Examiner*—Stephen Brinich
(74) *Attorney, Agent, or Firm*—Mark Costello; Mark Z. Dudley

(57) ABSTRACT

A method of quantizing pixels from a first pixel depth to a second includes adding to an original value of each pixel to be quantized, an error value resulting from quantization of any previous pixels, to generate a modified pixel value; comparing each modified pixel with threshold varying in accordance with the gray difference that a printed mark would make to a neighborhood pixels and outputting second depth pixels responsive to said comparison; and determining a halftoning error as a function of the modified pixel values, the gray difference, and the binary signals, and distributing say error to other gray level pixels in an image.

9 Claims, 2 Drawing Sheets

METHOD OF ERROR DIFFUSION USING 2×2 COLOR CORRECTION AND INCREMENT MATCHING

Figure 1:
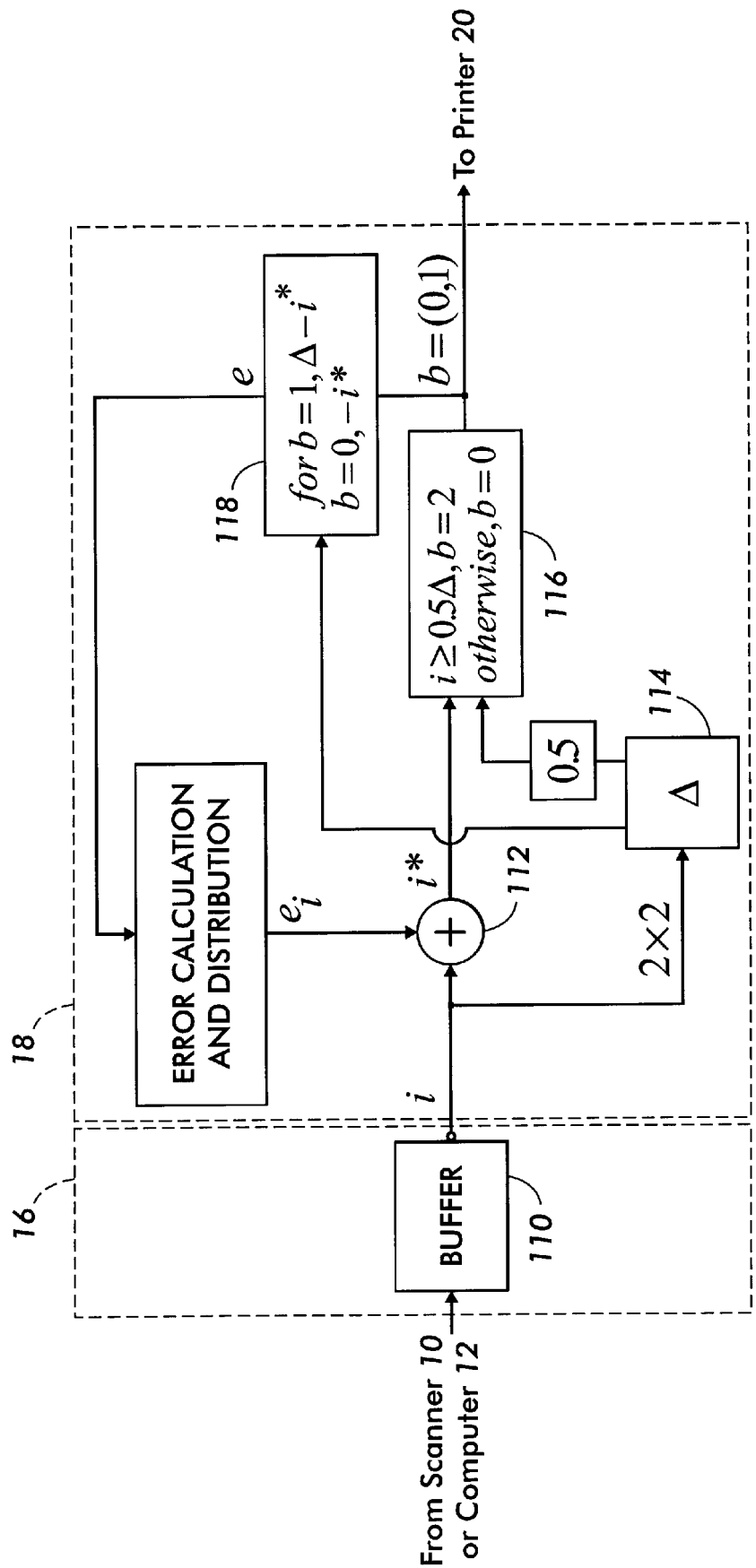

The present invention generally relates to a digital halftone correction system and more particularly to an improved system for halftone correction which addresses the effects of printed dot overlap in halftoning and solves the problem of causality in the correction process.

Digital halftoning, also referred to as spatial dithering, is a process in which digital input signals to a digital printer are modified prior to printing a hard copy, such that a digitally printed version of a photographic image creates the illusion of the continuous tone scale of the photographic original. Most hard copy devices such as ink-jet printers and laser printers, whether write-black, write-white, or in color, operate in a binary mode, i.e. a printed dot is either present or absent on a two-dimensional printer medium at a specified location. Thus, due to the binary nature of such printers, a true continuous tone reproduction of a photographic image is not possible with digital printers. However, to approach the appearance of continuous tone, digital input signals to the printer are modified prior to printing. Thus, the printer is controlled to spatially distribute fewer or more printed dots in the neighborhood or vicinity of a designated dot, increasing or decreasing the distribution of printed dots about a designated area on the print.

Different types of printers, and even different printers among the same printer type, produce differently sized and shaped printed dots. Even a particular digital printer frequently generates printed dots having a size variation as a function of dot position on a page. It has become apparent that a halftone correction system must be tailored to the characteristics of a particular chosen digital printer.

Frequently, printed dots are of a size and shape such that dots printed adjacent to each other tend to overlap. Accordingly, a successful halftone correction system should include considerations related to dot overlap correction.

In a recent publication, titled "Measurement of Printer Parameters for Model-based Halftoning", Pappas et al., Journal of Electronic Imaging, Vol. 2 (3), pages 193–204, July 1993, there are described various approaches toward halftone correction based on a dot overlap model of dots printed by a particular digital printer. To accomplish halftone correction, Pappas, et al. describes printing of a variety of test patterns by the same printer. The test patterns are intended to be used for characterization of printed dot overlap and are measured by a reflection densitometer (see particularly pages 198 and 199 of the Pappas, et al. publication) so as to obtain measured values of average reflectance of these various test patterns. The calculated printer model parameters, based on the measurement of test patterns, are then used to provide halftone correction or gray scale rendition of digital image data representative of an original image to be printed. See also, U.S. Pat. No. 5,649,073 to Knox.

Halftone correction can be accomplished for example by a known so-called modified error diffusion algorithm or by a known least-squares model algorithm. In the overlap correction approach described by Pappas et al., each printed dot is positioned within a superimposed or overlaid virtual Cartesian grid such that the center of each dot is coincident with the center of the spacing between adjacent grid lines. Accordingly, Pappas, et al. requires at least 32 total test patterns for the simplest shape of the scanning window, 512 possible test patterns for a 3×3 scanning virtual window, and a total of 33,554,432 possible test patterns for a 5×5 scanning virtual window matrix. Even when considering that dot overlapping can be symmetric about both the x and y directions of the grid, thereby reducing the number of possible patterns, the computational complexity and associated complicated optimization calculations become formidable in the overlap correction approach described by Pappas, et al.

Another publication, titled, "Measurement-based Evaluation of a Printer Dot Model for Halftone Algorithm Tone Correction", by C. J. Rosenberg, Journal of Electronic Imaging, Vol. 2 (3), pages 205–212, July 1993, describes a tone scale correction approach for digital printers which produce potentially overlapping circular dots, each dot centered at the center of a grid opening of a superimposed grid. This dot-overlapping model assumes that all printed dots have a perfectly circular shape. Here, the reflectance of a number of constant gray scale test patches or test patterns is measured, and the reflectance values are inverted to obtain a correction curve. This measurement-based calibration of a printer (see FIG. 2 of the Rosenberg paper) is repeated for all digital gray levels anticipated to be printed by the printer. The tone response correction curves are then used in conjunction with one of several known halftoning algorithms to generate a calculated dot diameter that would provide a best fit to the measured data.

U.S. Pat. No. 5,469,267 to Wang et al. describes a process, where, prior to printing on a digital printer a halftone reproduction of a continuous one original image, digital image signals are corrected for the effects of printed dot overlap generated by a particular chosen digital printer. The dot overlap correction is based upon superimposing a virtual screen on the printer-generated dot patterns such that the printer dots are centered at the orthogonal intersections of the lines defining openings in the screen. This centering approach allows for determination of printed dot overlap by a 2×2 matrix, so that only seven test patterns are required for characterization of the printer and for dot overlap correction of halftone prints produced by the printer.

However, one problem exists for applying 2×2 correction to error diffusion due to the causality constraints. In error diffusion, the pixels are processed from top to bottom and from left to right. In determining the gray level of a pixel, four 2×2 matrices (upper left, upper right, bottom left, bottom right) are involved. In processing a pixel, only one of the 2×2 matrices (the upper left one) is available as all the others contain unprocessed pixels.

SUMMARY OF THE INVENTION

In accordance with the invention, and error diffusion method is used to quantize pixels, using 2×2 neighborhood correction.

In accordance with one aspect of the invention there is provided method of quantizing pixels from a first pixel depth to a second includes adding to an original value of each pixel to be quantized, an error value resulting from quantization of any previous pixels, to generate a modified pixel value; comparing each modified pixel with threshold varying in accordance with the gray difference that a printed mark would make to a neighborhood pixels and outputting second depth pixels responsive to said comparison; and determining a halftoning error as a function of the modified pixel values, the gray difference, and the binary signals, and distributing say error to other gray level pixels in an image.

A method of quantizing gray pixels to binary pixels for printing, including the steps of: storing halftone response characterizations in memory, representing an amount of gray difference that a mark on paper will provide for a selected printer; adding to an original value of each pixel to be quantized, an error value resulting from quantization of any previous pixels, to generate a modified pixel value; using said stored halftone response characterizations to control a thresholding process; thresholding the modified pixel values to binary signals; and determining a halftoning error as a function of the modified pixel values, the halftone characterizations, and the binary signals, and distributing the halftoning error to other gray level pixels in an image.

The invention uses 2×2 color correction in an error diffusion halftoning process. Local color correction and error diffusion can be integrated naturally and free of the causality problem. In error diffusion, quantization error is determined by a comparison between a modified input and a corresponding output. However, in the improved process, the actual color increments are compared with the output color increment. More specifically, if the input contone value at pixel (m, n) is i, the function is interpreted as a desire to increase the color by an amount of i at the neighborhood of pixel (m, n). This contrasts with more traditional error diffusion process, that calculates the amount of color at pixel (m, n) should be i. In many cases the two interpretations are equivalent, such as in the ideal case, where ink fills only the interior of a pixel. In more typical non-ideal cases, ink coverage goes well beyond the pixel boundaries. Such non-ideal responses are a problem using traditional error diffusion, but the problem does not exist where the incremental approach of the present invention is used.

Figure 2:
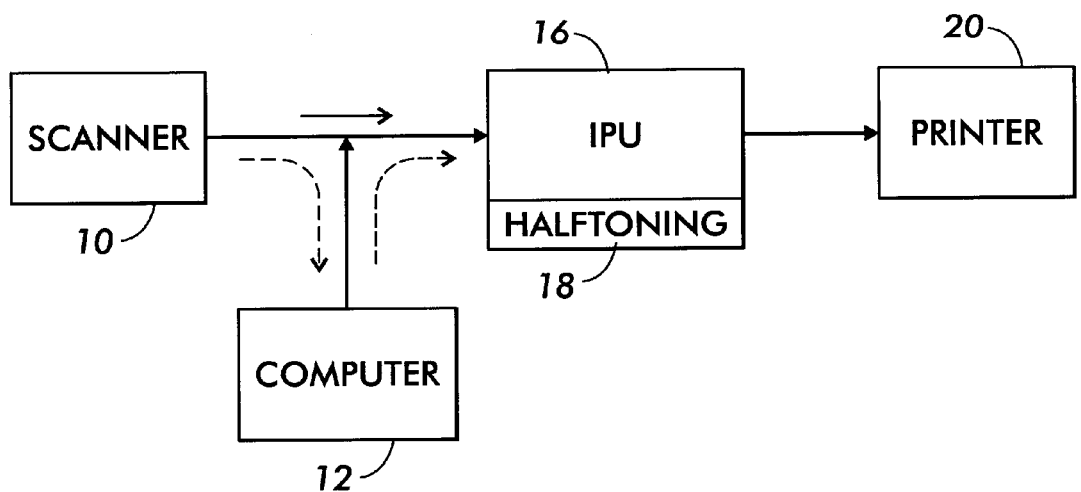

These and other aspects of the invention will become apparent from the following description used to illustrate a preferred embodiment of the invention in conjunction with the accompanying drawings in which:

FIG. 1 shows a printing system, in which one example of the present invention might be implemented; and FIG. 2 shows a highly schematic block diagram of image signal processing in accordance with the invention.

Referring now to the drawings where the showings are for the purpose of describing an embodiment of the invention and not for limiting same, a basic image processing system is shown in FIG. 1. In the present case, gray image data may be characterized as image signals or pixels, each being defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of gray levels to one of two legal or allowed binary levels for printing in a binary printer.

As used herein, a "pixel" refers to an image signal associated with a particular position in an image, having a density between a minimum and a maximum. Accordingly, pixels are defined by intensity and position. "Gray", as used herein does not refer to a color unless specifically identified as such. Rather, the term refers to image signals that vary between maximum and minimum, irrespective of the color of the separation in which the signals are used. However, the term "color" will be used to mean colorant, whether black, cyan, magenta, yellow, or otherwise.

In a color system, color documents are represented by multiple sets of image signals (bitmaps), each set (or separation) represented by an independent channel, which is usually processed independently. A "color image" is therefore a document including at least two separations, such as in the Xerox 4850 Highlight Color Printer and commonly three or four separations, such as in the Xerox 4900 Color Laser or sometimes more than four separations. One possible digital copier (a scanner/printer combination) is described for example, U.S. Pat. No. 5,655,061 or U.S. Pat. No. 5,659,634 incorporated herein by reference.

Each document provides a set of image signals or pixels that will drive a printer to produce an image. In the case of multicolor printers, the separations, superposed together, form the color image. In this context, we will describe color pixels as the combination of pixels that represent optical density of the document image in a given small area thereof.

With reference now to FIG. 1, which shows a general system requirement representing the goal of the invention. An electronic representation of a document (hereinafter, an image), from an image input terminal such as scanner 10, is derived in some manner, in a format related to the physical characteristics of the device. The image is typically described as gray level pixels. Commonly, scanner-derived pixels are defined at m bits per pixel. Common scanners, for example, produce 8 bit/pixel data, at resolutions acceptable for many purposes, although lower or higher pixel depth is possible. If this is a color document, the image may be defined with two or more separation bitmaps, usually with identical resolution and pixel depth. The scanner may convert the image into one of several luminance chrominance spaces prior to directing the image signals onward.

Electronic image signals from scanner 10 may be directed on for processing directly, or to an appropriately programmed general-purpose computer 12, or the like. Alternatively, the source of image data may be the appropriately programmed general-purpose computer either locally connected or remotely connected via a network. Electronic image signals are directed through an image processing unit (IPU) 16 to be processed so that an image suitable for reproduction on image output terminal or printer 20 is obtained. Image processing unit 16 commonly includes a halftoner 18 that converts c bit digital image signals to d bit digital image signals, suitable for driving a particular printer, where c and d are integer values. IPU 16 may be part of the printer 20, or part of a general-purpose computer 12, and is shown in its present configuration for convenience only. It may include special purpose hardware, or merely represent appropriate programs running on the general purpose or special purpose computer. It may also represent a program running on a remote computer.

Prior to considering the invention, the idea of testing or calibrating a printer for its response will be discussed. Since a goal of the invention is to take into account pixel overlap, it is important to address how a printer overlaps pixels in its operation. This issue has been studied to some extent, and a method for measuring printer response characteristics with as few as seven measurements has been proposed in U.S. Pat. No. 5,469,267 to Wang, fully incorporated by reference herein.

Considering a 2×2 matrix of binary pixels, it is clear that when combinations of each of the positions of the pixel are filled, there is substantial overlap throughout the matrix. This simplest 2×2 overlapping matrix leads to only 16 possible combinations of overlap from the four binary codes representative of the four possible dot status conditions. Accordingly, an output function G' has a maximum of 16 independent parameters which can be expressed as 16 different overlapping patterns. Using conditions of symmetry of dot overlap about both the X' and Y' directions, only seven independent overlap patterns are required. Accordingly, seven spatially periodic and independent test patterns are generated as a binary input to the chosen printer to be tested. Each test pattern is characterized by one of the seven distinct and independent dot overlap patterns.

Test patterns are directed to the printer directing it to produce square-shaped dots without any overlap among adjacent printed dots. The input signals of these patterns are then printed by the chosen non-ideal printer, for example by a write-black printer on a white reflective printer medium for determining the effect of dot overlap corresponding to the remaining independent overlap patterns.

A sampling of patterns $T_0$–$T_6$ can be mapped to each of the corresponding overlap patterns $P_0$–$P_{15}$ to give the measured and normalized average reflectance output values G' as well as the idealized output values G representative of perfectly square-shaped dots of area delta x X delta y. The estimated printer output values G' can represent average reflectance values of overlapping dots when the dots are printed on a reflective printer medium such as paper. Alternatively they can represent average transmittance values when overlapping dots are printed on a transparent printer medium. The G' values are normalized to fall within the range of digital gray level signals which are identical to the range of digital image signals provided by the image scanner used to digitize an original continuous tone two-dimensional image. The fill factor or fraction of overlap within window W is also provided for ideally shaped square dots for each of the overlapping patterns. Generally, however, the response of the printer to halftoning containing signals can be predicted, and therefore corrected.

Further processing of these normalized printer output values G' can include an error-diffusion halftoning approach such as a known so-called Floyd-Steinberg error-diffusion method. This well-known error-diffusion method requires the comparison of a desired gray level of image signals with a threshold level T, which in that method is centered at a signal level of 128 for 8-bit gray levels (out of a total of 256 available image signal gray levels). In contrast to the standard error-diffusion halftoning, the dot overlap halftone correction system requires a threshold level T related to the 2×2 matrices. To avoid the causality problem, the upper left matrix is used as given by the following relationship:

$$T=0.5*\{G'[B(j-1,i-1),B(j,i-1),B(j-1,i),0]+G'[B(j-1,i-1),B(j,i-1),B(j-1,i),1]\},$$

where

T=threshold level

G'=a printer output function, such as, for example, an average reflectance within a currently examined window;

B(i, j)=binary discrete printer input function which controls the printed dots either on or off (i.e. a dot is present or absent);

i, j=integers with 0</=i<M and 0 j<N, which determine the location of a dot in an orthogonal matrix of columns of dots (M) and rows of dots (N).

This threshold determination takes into consideration the effect of dot overlap and the resultant non-ideal G' values of average reflectance or transmittance from the test patterns $T_0$–$T_6$, and hence relates to the dot overlap patterns. Based upon these threshold values for each of the test patterns, the multi-level digital image signals representative of the digitized original image are then used in conjunction with a known halftoning program. A final digital print has a dot overlap halftone correction which renders the appearance of the digital print from a chosen digital printer a best-matched replica of the original two-dimensional continuous tone image. The method functions generally well. However, as only one of the four 2×2 matrices is applied in the operation, it changes the behavior of error diffusion frequency responses. It generates sometimes correlated halftone textures.

Turning now to the invention, in error diffusion, quantization error is determined by a comparison between a modified input and a corresponding output. However, in an improved process, the actual color increments are compared with the output color increment. To be more specific, if the input contone value at pixel (m, n) is i, the function is interpreted as a desire to increase the color by an amount of i at the neighborhood of pixel (m, n). This contrasts with more traditional error diffusion process, which would calculate the amount of color at pixel (m, n) should be i. In many cases the two interpretations are equivalent, such as in the ideal case, where ink fills only the interior of a pixel. In more typical non-ideal cases, ink coverage goes well beyond the pixel boundaries. Such non-ideal responses are a problem using traditional error diffusion, but the problem does not exist where the incremental approach of the present invention is used.

FIG. 1 is a modified error diffusion circuit of the type contemplated by the invention. Signals received at input 108 (label 108 is missing in FIG. 1) may be stored in a buffer 110. Signal i is modified by the addition thereto of past shares of error, combined into signal $e_I$ at adder 112.

At the same time, a signal representing the 2×2 neighborhood is used to access a memory device 114 storing Δ for the printer. The values Δ are previously derived and stored as part of the system calibration, discussed above, as a function of the gray difference that a drop will make, where $$\Delta=G_1-G_0,$$

Where $G_0$ and $G_1$ are respectively, the total gray levels in the four 2×2 quadrants before an after the ink is printed respectively.

Upon receipt of signals from a particular 2×2 neighborhood, a Δ value is output to thresholding device 116. The Δ value is multiplied by 0.5 for convenience in calculation prior to reaching the thresholding device.

At thresholding device, the value i* is compared to 0.5Δ. If I* is greater than 0.5Δ, then an output binary signal 1 is directed to the printer. Otherwise, an output binary signal 0 is directed to the printer. Of course, other output signals are possible, depending on the capability of the printer.

The resulting output signal value more accurately represents the required increment at a particular location, since the output signal is a function of the gray difference Δ that a drop will make, and the input signal. The signals b=(1, 0), over the entire image, together form the bitmap for the image to be reproduced.

In standard error diffusion, the modified value I* would then be subtracted from the output value b, to determine the halftoning error to be passed to successive pixels. However, in the present invention, at block 118 error is determined as a function of Δ, the modified input signal and the output value, again reflecting the desire to reflect the increment of color that would be required for a given image to be accurate. For b=1, error is given as Δ−i*.

With a value e determined for pixel I, the error is distributed in accordance with standard error diffusion techniques, as taught by Floyd Steinberg, U.S. Pat. No. 5,353,127 to Shiau et al., or any of many other error distribution methods.

While particular values have been described here, they are used as a convenient working example. If a correction neighborhood of greater than 2×2 is desired, such a neighborhood can be accommodated. More samples may have to be taken to correctly characterize the operation of the printer, and more distinct values of Δ will be stored.

It will also no doubt be appreciated that while the example provided only halftones a single separation, multiple separation and colored images may be halftoned as well. Such devices or processes may operate on separations or independent color channels serially, with the same device or process used repeatedly for each separation or channel, or in parallel, by providing a plurality of devices or processes corresponding to a number of separations or color channels. Of course, the inventive halftoning method may also be used alone, or in combination with other halftoning methods. A user may want to stochastically screen some separations, while non-stochastically screening others. Alternatively, different image effects may be obtained by using a first and second quantization process, with the first process quantizing pixels from c to d and the second from d to e, where e would represent a number of pixels suitable for use with a printer, and d>e. The invention may be used as either the first or second process.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A method of quantizing image pixels, in which for an image formed by a plurality of pixels, each pixel representing an optical density of the image at a location within the image, and having an original value associated therewith selected from of a set of optical density values having an number of members larger than a desired output set of optical density values, the steps comprising:

storing a set of values Δ, representing a gray difference that a mark on a print substrate will provide for a selected printer, each value of Δ corresponding to a printing pattern of pixels;

receiving a pixel to be quantized, and a set of neighboring pixels;

adding to the original value of each said pixel to be quantized, an error value resulting from quantization of any previous pixels, to generate a modified pixel value;

using said pixel to be quantized and said set of neighboring pixels, together forming a printing pattern of pixels, to identify a value of Δ to be used for quantization and error calculation;

quantizing said modified pixel value by comparison to a fraction of said identified value of Δ, and selecting a member of the desired output set of optical density values as an output signal;

calculating a halftoning error using said output signal, said identified value of Δ and said modified pixel value; and distributing said halftoning error to a a pre-selected set of pixels.

2. The method described in claim 1, where said set of values Δ is derived during a printer calibration process.

3. The method as described in claim 1, wherein said pixel to be quantized is represented by 8 bits of data.

4. The method as described in claim 1, where said set of neighboring pixels includes a few 2×2 sets of pixels adjacent and including said pixel to be quantized.

5. The method as described in claim 1, where said values of Δ are stored in a memory associated with the process.

6. The method as defined in claim 1, where said fraction is about 0.5.

7. The method as defined in claim 1, wherein, for a binary values output set, said quantization process selects a member of the output set in accordance with the relationship:

$i^* > 0.5\Delta$, b=1

Otherwise, b=0 where I* is the modified pixel to be quantized and b is the output pixel value.

8. A method of quantizing gray pixels to binary pixels for printing, including the steps of:

storing halftone response characterizations as a set of values in memory, said set of values representing an amount of gray difference that a mark on paper will provide for a selected printer;

adding to an original value of each pixel to be quantized, an error value resulting from quantization of any previous pixels, to generate a modified pixel value;

using a fraction of at least one of said stored values to control a thresholding process;

thresholding, according to said thresholding process, said modified pixel values to binary signals; and determining a halftoning error as a function of the modified pixel values, the halftone characterizations, and said binary signals, and distributing said error to other gray level pixels in an image.

9. A method of quantizing pixels from a first pixel depth to a second, lower pixel depth, including:

adding to an original value of each pixel to be quantized, an error value resulting from quantization of any previous pixels, to generate a modified pixel value;

comparing each modified pixel with threshold varying in accordance with a fraction of a value representative of the gray difference that a printed mark would make to a neighborhood of lower pixel depth pixels;

determining output pixels at said lower pixel depth from said comparison;

determining a halftoning error as a function of said modified pixel values, said gray difference, and said binary signals, and distributing said error to other gray level pixels in an image.

* * * * *